Patented Oct. 27, 1936

2,058,521

UNITED STATES PATENT OFFICE 2,058,521

ETHERS OF MORPHINE AND ITS DIHYDROGENATED DERIVATIVE, AND METHODS OF PRODUCTION

Lyndon Frederick Small, Charlottesville, Va., assignor to the Government of the United States, represented by the Secretary of the Treasury No Drawing. Application October 22, 1935, Serial No. 46,215

18 Claims. (Cl. 260—25)

(Granted under the act of March 3, 1883, as amended April 30, 1928; 370 O. G. 757)

The invention described herein may be manufactured and used by or for the Government of the United States for governmental purposes only without payment of any royalty thereon.

The present invention includes new ethers of morphine and of its dihydrogenated derivative, dihydromorphine, which are superior in certain respects to morphine, and which may serve to replace morphine or its previously known derivatives in pharmaceutical preparations and in medical applications. The subjects of the invention show a higher degree of physiological activity than morphine, and possess the advantage of a greater margin of safety than morphine. The product of the invention is intended to be administered through the mouth or rectum or by injection, and thus, obviously while the terms "morphine" and "dihydromorphine" or ethers of these, are used herein as representative for purposes of definition, they are intended to be interpreted as including compounds such as the salts of these basic substances with inorganic or organic acids.

Accordingly, while specific salts are mentioned in the illustrative examples of the invention hereinafter, these are only representative of the numerous posssible salts commonly employed for medical use, and the use of the basic terms in the appended claims is likewise to be interpreted as inclusive of such salts.

The invention comprises three new ethers of morphine and dihydromorphine, in which the alcoholic hydroxyl group of the parent substances (morphine and dihydromorphine) has been etherified, viz:

1. Morphine alcoholic ethyl ether (heterocodethylin or heteroethylmorphine).
2. Dihydromorphine alcoholic ethyl ether (dihydroheterocodethylin, heteroethyldihydromorphine).
3. Dihydromorphine alcoholic methyl ether (dihydroheterocodeine).

The first product of the invention mentioned above, morphine alcoholic ethyl ether is attained as follows:

One hundred and eight grams of the well-known methoxymethyl ether of morphine (see Mannich, Archiv der Pharmazie, vol. 254, page 349, of 1916; German Patent No. 280,972) is treated with 65 cc. of 30% hydrogen peroxide, whereupon a vigorous reaction takes place and the methoxymethylmorphine goes into solution; most suitably the temperature is not allowed to rise above 50° C. The frothy mobile liquid is then warmed at 50° C. for 20 minutes. The excess of hydrogen peroxide and water is removed under diminished pressure at a temperature of 40° to 50° C. The frothy glass-like mass is treated with about 200 cc. of hot acetone in which it dissolves readily. The walls of the vessel are gently rubbed with a glass rod, whereupon crystallization takes place; the crystalline product is practically insoluble in acetone, and is washed thoroughly on the filter with cold acetone. This product is the hitherto-unknown crystalline form of methoxymethylmorphine-N-oxide, and contains one molecule of acetone of crystallization. The yield is 116.5 grams of pure white crystals.

One hundred and sixteen grams of methoxymethylmorphine-N-oxide acetone compound is dissolved in 100 cc. of water in a vessel equipped with an efficient stirring device, and an excess of diethyl sulfate (about 180 cc.) and of 10-normal sodium hydroxide solution (about 180 cc.) added dropwise over a period of five to six hours, in such manner that the solution remains always alkaline; during the operation, the containing vessel is cooled in an ice bath, and the reaction mixture stirred vigorously. The solution is stirred for a further period of four hours at room temperature, acidified immediately with 25% sulphuric acid solution, and the acid solution extracted with ether to remove unused diethyl sulfate. The aqueous layer, usually containing some oily methoxymethylmorphine ethyl ether-N-oxide sulfate, at a temperature of about 60° C., is treated with gaseous sulfur dioxide during several hours, cooled, made ammoniacal, and extracted many times with ether. The yield of crude crystalline morphine alcoholic ethyl ether obtained by distillation of the ether is about 51 grams. The base may be purified as such by crystallization from organic solvents, most advantageously ethyl acetate, or may be purified by crystallization of its sparingly soluble salts, notably the salicylate, the hydrochloride, the hydrobromide, the hydriodide, and the perchlorate.

Morphine alcoholic ethyl ether is found by analysis to have the formula $C_{19}H_{23}O_3N + H_2O$; it melts at 110–112° C., and has the specific rotation $$(\alpha)\frac{23}{D} - 178.8°$$

(alcohol, $c=1.012$). Its hydrochloride, (heterodionin) of formula $C_{19}H_{24}O_3NCl + 3H_2O$ melts at 241–243° C. in an evacuated tube, and has the specific rotation $$(\alpha)\frac{24}{D} - 134.9°$$

in aqueous solution.

As variations of this process, various ethyl halides, as ethyl iodide, ethyl bromide, or ethyl chloride may be substituted for diethyl sulfate. Furthermore, in place of morphine methoxymethyl ether, the well-known morphine benzyl ether may be used. This variation has the advantages that morphine benzyl ether is much cheaper to prepare and is obtained in better yields than morphine methoxymethyl ether. In this modification, the product of ethylation carried out as described above, namely, benzylmorphine ethyl ether-N-oxide is first reduced in acid solution with sulfur dioxide, and the resulting benzylmorphine ethyl ether is then heated with acids (preferably 3-normal hydrochloric acid) until an alkali-soluble product is obtained; this is morphine alcoholic ethyl ether, identical with that described above.

The second product of the invention, dihydromorphine alcoholic ethyl ether is attained as follows:

Seventeen grams of the above-described morphine alcoholic ethyl ether hydrochloride (heterodionin) suspended or dissolved in a convenient amount of water (about 200 cc.) is agitated in an atmosphere of hydrogen in the presence of one gram of palladium-barium sulfate catalyst, whereby about one mole of hydrogen is absorbed. After removal of the catalyst, the solution is concentrated under diminished pressure at about 60° C.; the hydrochloride of dihydromorphine alcoholic ethyl ether separates crystalline in nearly quantitative yield. On cautious addition of dilute ammonia to an aqueous solution of the above hydrochloride (most advantageously in the presence of a trace of ether) the dihydromorphine alcoholic ethyl ether separates as fine white crystals, and may be further purified by crystallization from ethyl acetate or other organic solvent. The hydrogenation may also be accomplished using solutions of morphine alcoholic ethyl ether in dilute acids, as acetic, tartaric, hydrochloric, sulfuric, etc., or in organic media, as methanol, ethanol, ethyl acetate, etc., and with other noble metal catalysts, or nickel catalysts.

As a variation of this process, the hitherto-unknown methoxymethyl ether of dihydromorphine (having the formula $C_{19}H_{25}O_4N$, the melting point 102–104° C. and the specific rotation $$(\alpha)\frac{20}{D} - 155.8°$$

(absolute ethanol, $c=1.219$)) or the hitherto-unknown benzyl ether of dihydromorphine (having the formula $C_{24}H_{27}O_3N$, the melting point 95–97° C. and the specific rotation $$(\alpha)\frac{24}{D} - 88.1°$$

(alcohol, $c=1.028$)) may be converted to their respective amine oxides, and the amine oxides then subjected to the ethylation process described under the first product of the invention. The resulting methoxymethyldihydromorphine alcoholic ethyl ether amine oxide, or the benzyldihydromorphine alcoholic ethyl ether amine oxide is then reduced with sulfurous acid and the methoxymethyl group or benzyl group, respectively, removed by hydrolysis in the presence of acids as described under the first product of the invention. This variation has the advantage that it may permit the utilization of dihydromorphine, which is obtained as a waste product in the manufacture of another useful narcotic drug.

The third product of the invention, dihydromorphine alcoholic methyl ether (dihydroheterocodeine) is attained as follows:

Five grams of the well-known morphine alcoholic methyl ether (Heterocodeine; see Mannich, Archiv der Pharmazie, vol. 254, page 439 of 1916) dissolved in a convenient quantity of methanol, ethanol, ethyl acetate, dilute acetic acid, dilute hydrochloric acid, dilute sulfuric acid, etc. is agitated in an atmosphere of hydrogen in the presence of a small quantity (80 mg.) of platinum or palladium catalyst, whereby one mole of hydrogen is absorbed; nickel catalysts may likewise be employed. The product, isolated in the usual way, is 5 g. of dihydromorphine alcoholic methyl ether, and is purified by crystallization from alcohol, ethyl acetate, or other organic solvent. It has the melting point 216–217° C. and the specific rotation $$(\alpha)\frac{26}{D} - 178.0°$$

(alcohol, $c=1.000$). Analysis shows the formula to be $C_{18}H_{23}O_3N$. The hydrochloride is prepared in alcohol with alcoholic hydrogen chloride, and has the specific rotation $$(\alpha)\frac{26}{D} - 136°$$

(water, $c=3.247$), the melting point 299–299.5° C. in vacuo, and the formula $C_{18}H_{24}O_3NCl$.

The third product of the invention may likewise be advantageously prepared by methylation of the hitherto-unknown methoxymethyldihydromorphine-N-oxide, or of the hitherto-unknown benzyldihydromorphine-N-oxide with dimethyl sulfate or methyl halides in alkaline solution by a procedure parallel to that described under the first product of the invention. In this case the products resulting from the methylation, methoxymethyldihydromorphine alcoholic methyl ether-N-oxide, and benzyldihydromorphine alcoholic methyl ether-N-oxide respectively, are reduced at the N-oxide group with sulfur dioxide and the methoxymethyl group and benzyl group in the resulting respective products is removed by hydrolysis with hot dilute acids. The product is dihydromorphine alcoholic methyl ether identical with that described above. In the methods for producing the products of the invention the amounts of the catalysts and solvents above mentioned may be varied within wide limits without greatly changing the result.

What I claim as new is:

1. A morphine derivative in which the hydrogen atom of the alcoholic hydroxyl group of morphine has been replaced by an ethyl group.

2. A new compound having the formula $C_{19}H_{23}O_3N$ and wherein the alcoholic hydroxyl group of morphine has been etherified with an ethyl group.

3. The method of preparing a new product of the morphine series which includes the ethylation of methoxymethylmorphine-N-oxide followed by reduction of the N-oxide structure, and removal of the methoxymethyl group by hydrolytic processes.

4. The method of preparing a new product of the morphine series which includes the ethylation of benzylmorphine-N-oxide followed by reduction of the N-oxide structure, and removal of the benzyl group by hydrolytic processes.

5. A dihydromorphine derivative in which the hydrogen atom of the alcoholic hydroxyl group in dihydromorphine has been replaced by an ethyl group.

6. A new compound having the formula $C_{19}H_{25}O_3N$ and wherein the alcoholic hydroxyl group of morphine has been etherified with an ethyl group and the alicyclic unsaturation of morphine saturated with two hydrogen atoms.

7. The method of preparing a new product of the morphine series which includes the hydrogenation of morphine alcoholic ethyl ether dissolved in dilute acids or in various organic solvents in the presence of noble metal catalysts or of nickel catalysts.

8. The method of preparing a new product of the morphine series which includes the ethylation of methoxymethyldihydromorphine-N-oxide followed by reduction of the N-oxide structure, and removal of the methoxymethyl group by hydrolytic processes.

9. The method of preparing a new product of the morphine series which includes the ethylation of benzyldihydromorphine-N-oxide, followed by reduction of the N-oxide structure, and removal of the benzyl group by hydrolytic processes.

10. A dihydromorphine derivative in which the hydrogen atom of the alcoholic hydroxyl group in dihydromorphine has been replaced by a methyl group.

11. A new compound having the formula $C_{18}H_{23}O_3N$ and wherein the alcoholic hydroxyl group of morphine has been etherified with a methyl group and the alicyclic unsaturation of morphine saturated with two hydrogen atoms.

12. The method of preparing a new product of the morphine series which includes the hydrogenation of morphine alcoholic methyl ether (heterocodeine) dissolved in dilute acids or in organic solvents, in the presence of noble metal catalysts or nickel catalysts.

13. The method of preparing a new product of the morphine series which includes the methylation of methoxymethyldihydromorphine-N-oxide followed by reduction of the N-oxide structure, and removal of the methoxymethyl group by hydrolytic processes.

14. The method of preparing a new product of the morphine series which includes the methylation of benzyldihydromorphine-N-oxide, followed by reduction of the N-oxide structure, and removal of the benzyl group by hydrolytic processes.

15. A dihydromorphine derivative in which the hydrogen atom of the alcoholic hydroxyl group in dihydromorphine has been replaced by an alkyl group.

16. The method of preparing a new product of the morphine series which includes the hydrogenation of morphine alcoholic alkyl ether dissolved in dilute acids or in various organic solvents in the presence of noble metal catalysts or of nickel catalysts.

17. The method of preparing a new product of the morphine series which includes the alkylation of N-oxide derivatives of dihydromorphine in which the phenolic hydroxyl is protected against alkylation by a group which can later be removed easily by hydrolysis, followed by reduction of the N-oxide structure, and removal of the protecting group by hydrolytic processes.

18. The method of preparing a new product of the morphine series which includes the ethylation of N-oxide derivatives of morphine in which the phenolic hydroxyl is protected against ethylation by a group which can later be removed easily by hydrolysis, followed by reduction of the N-oxide structure and removal of the protecting group by hydrolytic processes.

LYNDON F. SMALL.